US009262887B2

(12) United States Patent
Johnson

(10) Patent No.: US 9,262,887 B2
(45) Date of Patent: *Feb. 16, 2016

(54) GAMING MACHINES WITH PLAYER RESERVATION FEATURE

(71) Applicant: Tipping Point Group, LLC, Las Vegas, NV (US)

(72) Inventor: Sam Johnson, Las Vegas, NV (US)

(73) Assignee: Tipping Point Group, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,732

(22) Filed: Dec. 5, 2014

(65) Prior Publication Data

US 2015/0170465 A1 Jun. 18, 2015

Related U.S. Application Data

(63) Continuation of application No. 13/457,795, filed on Apr. 27, 2012, now Pat. No. 8,915,783.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3227* (2013.01); *G07F 17/32* (2013.01); *G07F 17/3204* (2013.01); *G07F 17/3239* (2013.01); *G07F 17/3269* (2013.01)

(58) Field of Classification Search

CPC ............ G07F 17/3227; G07F 17/3237; G07F 17/3269; G07F 17/3283

See application file for complete search history.

(56) References Cited

U.S. PATENT DOCUMENTS

| | | | |
|---|---|---|---|
| 5,429,361 | A | 7/1995 | Raven et al. |
| 5,954,583 | A | 9/1999 | Green |
| 6,379,246 | B1 | 4/2002 | Dabrowski |
| 7,413,513 | B2 | 8/2008 | Nguyen et al. |
| 7,491,122 | B2 | 2/2009 | Ryan |
| 7,588,495 | B2 | 9/2009 | Walker et al. |
| 7,611,409 | B2 | 11/2009 | Muir et al. |
| 7,699,703 | B2 | 4/2010 | Muir et al. |
| 7,877,798 | B2 | 1/2011 | Saunders et al. |
| 8,142,278 | B2 | 3/2012 | Tsukahara |
| 8,342,957 | B2 | 1/2013 | Carpenter et al. |
| 8,469,788 | B2 | 6/2013 | Carpenter et al. |
| 8,475,266 | B2 | 7/2013 | Arnone et al. |
| 8,485,906 | B2 | 7/2013 | Walker et al. |
| 8,512,118 | B2 | 8/2013 | Lui et al. |
| 8,529,328 | B2 | 9/2013 | Tarantino |
| 8,602,877 | B2 | 12/2013 | Carpenter et al. |

(Continued)

*Primary Examiner* — Steven J Hylinski

(74) *Attorney, Agent, or Firm* — Weide & Miller, Ltd.

(57) ABSTRACT

A player reservation feature is provided for a casino gaming machine by a secondary controller of the casino gaming machine. The player reservation feature may be accessed at the gaming machine or remotely at another gaming machine or other device, e.g., a smart phone, tablet, personal computer, and the like. The gaming machine is locked and unavailable for play except by the player that made the reservation. Reserving a gaming machine may be free, or a fee may be accessed for a reservation. Where a fee is assessed, the fee may be waived for a reserving player. Where the reservation feature is being accessed remotely, a casino floor map may be displayed at the device that is being used, such as another casino machine, smart phone, tablet, personal computer, and the like, along with information about each gaming machine on the casino floor.

18 Claims, 7 Drawing Sheets

(56) References Cited

U.S. PATENT DOCUMENTS

| | | | |
|---|---|---|---|
| 8,632,395 | B2 | 1/2014 | Arnone et al. |
| 8,915,783 | B2 | 12/2014 | Johnson |
| 2006/0189382 | A1 | 8/2006 | Muir et al. |
| 2006/0211493 | A1 | 9/2006 | Walker et al. |
| 2008/0039193 | A1 | 2/2008 | Muir et al. |
| 2008/0132308 | A1 | 6/2008 | Muir et al. |
| 2008/0139306 | A1 | 6/2008 | Lutnick et al. |
| 2009/0054131 | A1 | 2/2009 | Jacobson et al. |
| 2009/0055204 | A1 | 2/2009 | Pennington et al. |
| 2009/0055205 | A1 | 2/2009 | Nguyen et al. |
| 2009/0098935 | A1 | 4/2009 | Jack |
| 2009/0104980 | A1 | 4/2009 | Lui et al. |
| 2009/0298583 | A1 | 12/2009 | Jones |
| 2009/0298593 | A1 | 12/2009 | Kobayashi et al. |
| 2010/0113161 | A1 | 5/2010 | Walker et al. |
| 2010/0211431 | A1 | 8/2010 | Lutnick et al. |
| 2010/0227684 | A1 | 9/2010 | Walker et al. |
| 2010/0285878 | A1 | 11/2010 | Tarantino |
| 2011/0105208 | A1 | 5/2011 | Bickley |
| 2011/0183762 | A1 | 7/2011 | Topham et al. |
| 2012/0040751 | A1 | 2/2012 | Peters |
| 2012/0083331 | A1 | 4/2012 | Carpenter et al. |
| 2012/0238341 | A1 | 9/2012 | Tarantino |
| 2012/0283022 | A1 | 11/2012 | Freele |
| 2012/0315981 | A1 | 12/2012 | Gagner et al. |
| 2012/0322545 | A1 | 12/2012 | Arnone et al. |
| 2012/0322563 | A1 | 12/2012 | Nguyen et al. |
| 2013/0084963 | A1 | 4/2013 | Shorrock et al. |
| 2013/0130786 | A1 | 5/2013 | Robbins et al. |
| 2013/0196744 | A1 | 8/2013 | Earley et al. |
| 2013/0231192 | A1 | 9/2013 | Walker et al. |
| 2013/0273996 | A1 | 10/2013 | Froy et al. |
| 2013/0303274 | A1 | 11/2013 | Gadher et al. |
| 2013/0337895 | A1 | 12/2013 | Froy et al. |
| 2014/0038706 | A1 | 2/2014 | Froy et al. |
| 2014/0094318 | A1 | 4/2014 | Nguyen et al. |
| 2014/0171183 | A1 | 6/2014 | Cardno |

GAMING MACHINES WITH PLAYER RESERVATION FEATURE

RELATED APPLICATION DATA

This application is a continuation of U.S. patent application Ser. No. 13/457,795, filed Apr. 27, 2012.

FIELD OF THE INVENTION

The present invention relates to casino-style gaming machines.

BACKGROUND OF THE INVENTION

The traditional gaming machines are custom created to have specific functionality. As a result, casinos have to either buy new machines or have existing machines reprogrammed to upgrade the machines with new features. Each alternative is expensive.

Typically, a player can choose any gaming machine that is not in play and begin playing. One problem with existing machines is that players often times have a favorite machine, which may not be available when the player wishes to play. Players may travel to a casino and find out that their favorite machine or machines are in play—especially at peak times such as Friday and Saturday night. Players may not wish to wait until their favorite machines become available and may not choose to choose one of the available machines. Where their favorite machine or machines is already in play, players may leave, opting to go to another casino.

SUMMARY OF THE INVENTION

Embodiments of the invention comprise a gaming machine with a player reservation feature. In accordance with one or more embodiments, the player reservation feature can be accessed at the gaming machine, e.g., via a screen displayed at the gaming machine, and/or remotely via one or more user interface screens displayed at another device, e.g., another gaming machine, smart phone, tablet, personal computer, and the like. A reserved gaming machine is locked at or about a time of a reservation such that the gaming machine is unavailable for play except by the player that has the reservation. Reserving a gaming machine may be free, or a fee may be charged for a reservation. Where the player reservation feature is being accessed remotely, using another casino gaming machine, smart phone, tablet, personal computer, and the like, the player may be presented with a casino floor map and information about each gaming machine on the casino floor at the "remote device."

In accordance with one or more embodiments, a casino system comprises at least one casino gaming machine comprising a housing, at least one video display, at least one player input device, a main game controller configured to output a video signal comprising game information to be displayed via the at least one video display regarding a wagering game presented at the gaming machine, and a secondary controller that is capable of receiving reservation information for use in reserving the casino gaming machine. The reservation information identifying a reservation of the casino gaming machine by a reserving player and comprising a reservation time and information identifying the reserving player.

A secondary controller of a gaming machine is capable of locking the gaming machine for use except for use by a player that has reserved the gaming machine. The secondary controller may lock the gaming machine at a time reserved by the reserving player or wait to lock to the gaming machine until the gaming machine becomes free where there is a player other than the reserving player using the gaming machine at the reserved time.

A secondary controller may unlock the casino gaming machine in response to input identifying the reserving player, which input may be received via the at least one player input device of the casino gaming machine. Where a secondary controller is communicatively linked with a presentation device of the reserving player, the secondary controller may receive input identifying the reserving player from the reserving player's presentation device and unlock the casino gaming machine in response to such input.

In one or more embodiments, a secondary controller of a casino gaming machine is capable of causing a video display of the casino gaming machine to display at least one reservation page and is further capable of receiving the reservation information via the at least one player input device of the casino gaming machine.

In accordance with one or more embodiments, the casino system comprises at least one casino server communicatively linked with a secondary controller of a casino gaming machine and a reserving player's presentation device. The casino server is configured to communicate with the reserving player's presentation device, including transmitting at least one web page of a website to the presentation device. The at least one web page comprising a casino floor map and information about each of the at least one casino gaming machine. The at least one web page may be for use in identifying a casino gaming machine for reservation. The secondary controller may be communicatively linked with the reserving player's presentation device and is capable of communicating the at least one reservation page to the reserving player's presentation device and receiving the reservation information from the reserving player's presentation device. In accordance with at least one embodiment, the secondary controller may be communicatively linked with the reserving player's presentation device via one or more casino servers.

A casino server may be configured to transmit a message about the reservation to at least one presentation device of the reserving player. The message may contain information notifying the reserving player that the at least one casino gaming machine is available for play in accordance with the reservation. A casino server may be configured to transmit such a message to a casino gaming machine currently in use by the reserving player. A secondary controller may cause such a message about the reservation to be transmitted to at least one presentation device of the reserving player and/or to a casino gaming machine in use by said reserving player.

In accordance with one or more embodiments, a secondary controller of a casino gaming machine may be communicatively linked with a reserving player's presentation device, and the secondary controller may intercept a video signal which is output from a master game controller of the casino gaming machine and route the video signal to the reserving player's presentation device. The video signal may be transmitted to the reserving player's presentation device for presentation of information regarding the game at the reserving player's presentation device. The secondary controller may be further configured to receive game input from the reserving player's presentation device and route the input to the main game controller of the casino gaming machine.

In accordance with one or more embodiments, a second controller of a casino gaming machine may be configured to assess a fee for a reservation and to accept payment of the fee from a reserving player. Such a secondary controller may be further configured to waive the fee for a reserving player based on one or more criterion. One such criterion involves waiving the fee for a reserving player that has reached a certain threshold level of play.

In accordance with one or more embodiments, a casino server may be communicatively linked with a secondary controller of each of a first casino gaming machine and a second casino gaming machine. The casino server may be configured to communicate with the secondary controller of the first casino gaming machine, including communicating at least one web page of a website, which web page, or pages, includes a casino floor map and information about each casino gaming machine for use by a player in identifying a casino gaming machine for reservation. The secondary controller of the first casino gaming machine may cause a video display of the first casino gaming machine to display the at least one web page of the website. The secondary controller of the first casino gaming machine being capable of receiving input, such as input provided via at least one player input device of the first casino gaming machine, which input identifies the second casino gaming machine.

The secondary controller of the first casino gaming machine being capable of communicating such information to the casino server. The casino server may be configured to establish a communication link between the first and second casino gaming machines. A secondary controller of the second casino gaming machine being capable of communicating at least one reservation page to the first casino gaming machine and receiving information for a reservation of the second casino gaming machine made by a player from the first casino gaming machine.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise at least one casino gaming machine with a player reservation feature. In accordance with one or more embodiments, a reserved gaming machine is locked at or about a time of a reservation such that the gaming machine is unavailable for play except by the player that has the reservation.

Figure 1:
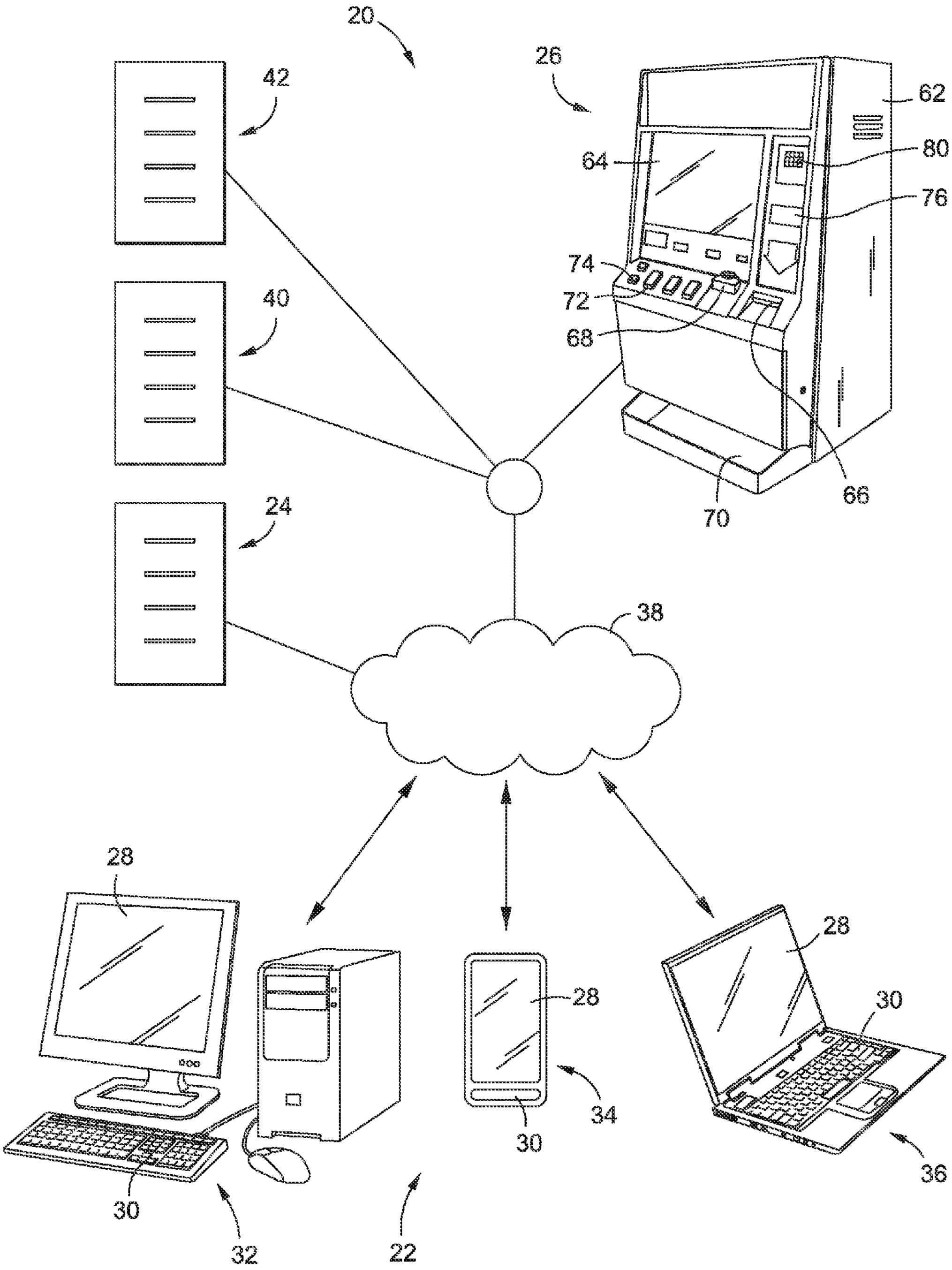
FIG. 1 diagrammatically illustrates a gaming system including one or more presentation devices and at least one casino gaming machines.

As illustrated in FIG. 1, in one embodiment, a system 20 comprises one or more presentation devices 22 (it being understood that while there may be two or more presentation devices 22, for convenience herein, the system is primarily described relative to a player's use of a "presentation device 22") and at least one casino gaming machine 26.

The presentation device 22 may be a dedicated/special purpose device or may be a general purpose device. The presentation device 22 is preferably an electronic device, and more preferably a computing device. The presentation device 22 may include at least one video display 28 capable of displaying game information, at least one player input device 30, and at least one communication interface.

The presentation device 22 might comprise, for example, a desktop computer 32, a telephone (including cellular, wireless or wired telephones) or PDA 34 (such as an iPhone®), a laptop or notebook computer 36, or various other devices. As indicated, the presentation device 22 might also comprise a special purpose device such as a specially configured gaming tablet.

The player input device 30 might comprise, for example, a keyboard, mouse, joystick, touch-screen, button(s), trackballs or other devices now known or later configured and which are capable of receiving input from a player. The communication interface is preferably configured to permit information or data to be exchanged from one or more remote device or locations with the presentation device 22. The one or more communication interface might support wired or wireless communications using various protocols. For example, if the presentation device 22 is a PDA, the communications might be by 3G, 4G, IMT, GSM or the like. If the presentation device 22 is a desktop computer, the communications might be by TCP/IP or the like. Of course, other protocols may be used such as Bluetooth, 802.11xx and the like.

It will be appreciated that the presentation device 22 may include other components. For example, the presentation device 22 may include a main processor, a video and/or audio processor, input and output ports or the like.

As indicated above, the system 20 preferably also includes one or more gaming machines 26. In a preferred embodiment, the gaming machines 26 are traditional casino-style gaming machines which are located at a casino (and as such are referred to as "casino gaming machines"). As described below, the casino gaming machines 26 may be part of a gaming system, such as a casino gaming system which links multiple of the gaming machines, one or more table games and other devices such as kiosks, accounting systems or servers, progressive systems or servers, player tracking systems or servers or the like.

Such traditional casino-style gaming machines 26 may have a plurality of features. For example, such a traditional casino gaming machine 26 may include a housing or cabinet 62 for enclosing/supporting various components of the gaming machine. The housing 62 may have a variety of configurations. In one embodiment, as illustrated, the housing 62 is configured so that the machine has an "upright" configuration. The casino gaming machine 26 might also be configured as a "slant"-type, "bar-top" or have other forms.

In one embodiment, the casino gaming machine 26 may be configured as a "video" type gaming machine, the machine including at least one display 64 for displaying game information to a player. The casino gaming machine 26 may include other means for providing information to a player. For example, speakers (not shown) or other devices may be provided for generating sound associated with the game. The casino gaming machine 26 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the casino gaming machine 26 thus includes a bill validator/acceptor 66 for accepting paper currency and a coin acceptor 68 for accepting coins. Other means of payment, such as a credit card reader, may be provided. An award of winnings in the form of coins may be paid to the player via a coin tray 70.

Preferably, the casino gaming machine 26 includes means for a player to provide input. In one embodiment, this means comprises one or more buttons. For example, a "spin" button 72 may be provided for permitting a player to start a game. One or more wager buttons 74 may be provided for a player to select the amount to bet on a particular game. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the casino gaming machine 26. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 70 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The casino gaming machine 26 may include one or more random number generators for generating random game events and results. In other embodiments, game results or information may be generated remotely (such as by a remote game server) and be transmitted to the gaming machine 26. It will be appreciated that the gaming machine 26 may be configured to present a wide variety of games which are now known or later developed, including card games such as poker and blackjack games, slot-type games, bingo games, keno games, sports wagering and other events or games.

As indicated, in one embodiment, game information is displayed by a video display 64 to a player. That display may be of a variety of types, including CRT, LCD, plasma and others. The gaming machine 26 may also include more than one video display.

In another embodiment, the casino gaming machine 26 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression of a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

Such casino gaming machines 26 may have other configurations, including other features. For example, the casino gaming machine 26 may include a player tracking device, such as a card reader 76 and associated keypad 80. Such player tracking devices are well known and may permit the game operator to track play of players of the gaming machine. The tracked play may be utilized to offer player bonuses or awards. In accordance with one or more embodiments, the player tracking device can facilitate a player's gaming machine reservation. In accordance one or more such embodiments, the player tracking device may be used to receive player, or user, identification information, which identification information may be used to reserve a casino gaming machine 26 for the player, associate a reservation with a known player for purposes of transmitting a message to the player, to the player's phone, tablet or other device or to another gaming machine 26 being used by the player, etc., that the casino gaming machine 26 that the player has reserved is available and/or that the reservation time has arrived.

In one embodiment, the casino gaming machine 26 may be configured to dispense media, such as printed paper tickets, which have associated value. For example, winnings or unused credits may be returned to the player via a printed ticket having value or associated value. In one embodiment, the casino gaming machine 26 might also be configured to accept such media for providing credit for game play. Relative to such casino gaming machines 26, an accounting server 40 may be used to generate ticket information to permit the gaming machine to dispense a value cash-out ticket, or to verify such a ticket which is presented at one of the casino gaming machines 26. Such systems are well known and thus not described in detail herein.

In one embodiment, a casino gaming machine 26 may be configured to dispense a ticket containing information about a player's reservation of this or another casino gaming machine 26, which ticket can be presented by the player at the reserved casino gaming machine 26 to unlock the casino gaming machine 26.

The player may be permitted to reserve a time for free, which benefit may be afforded to a player as a result of the player reaching a certain level of play or a commitment to play games at a certain minimum bet level (such as all games at a maximum bet permitted for the game, in which case a secondary controller of the gaming machine may lock the game so that it can only be played at the agree-to wager amount(s)), as a promotion or for other reasons, in exchange for player points or other non-monetary credits, or the player may be required to pay (such as using cash or monetary credits) to reserve a casino gaming machine 26. The cost of a reservation might depend on the length of reserved time, the particular machine that the player is reserving, the time of day, etc. In one embodiment, a player might earn player tracking points, as is known relative to existing casino player loyalty systems, and the player might use such points to "pay" for a reservation. In another embodiment, the player might earn specific reservation points (such as based upon amounts wagered, numbers of games played, wins, etc.), which reservation points can only be redeemed for reservations. Where the player is charged a fee, the player might be required to pay the fee at the time they make the reservation. The fee might be paid using winnings or unused credits associated with a ticket dispensed to the player. Alternatively, the fee might be paid by the player with currency input via a coin acceptor 68 and/or bill validator/acceptor 66, and/or the fee may be paid using a credit or debit card and card reader 76 and keypad 80, of a casino gaming machine 26.

A casino may have numerous such casino gaming machines 26, such as located on a casino floor or in other locations. Of course, such casino gaming machines 26 might be used in other environments, such as an airport, a bar or tavern or other locations.

As used herein, the term "casino gaming machine" may include other types of gaming machines or device. Such might comprise, for example, gaming tables. Such tables may be manually operated or be fully or partially automated. A variety of games may be offered at such tables. Of course, the gaming machines may include other types of devices as well.

In a preferred embodiment, the invention has particular utility to gaming machines which include at least one player interface via which information may be presented or displayed to the player. Such an interface preferably comprises at least one electronic video display. Such a display might comprise, for example, a display of a gaming machine 26 such as described above, or such might comprise a display located at a gaming table or other device.

As indicated above and as illustrated in FIG. 1, the system 20 of the invention may further comprise other systems and components. In one embodiment, the system 20 may further comprise the above-referenced accounting server/system 40 and/or a player tracking server/system 42 or the like.

The accounting server 40 may track monetary transactions, including information regarding monetary value provided by a player, amounts wagered by a player and amounts won by a player, such as described in more detail below. The accounting server 40 may a computing device which has a processor for executing instructions, a memory for storing data such as instructions and monetary value information, and at least one communication interface. The accounting server 40 may comprise one device or a number of devices which are in communication with one another at one or more times. For example, the accounting server 40 may communicate with an external data storage device. Additional details regarding the account server 40 are described below.

The player tracking server 42 may be configured to store player identity information and information regarding the player's gaming or other activities, as is well known. The player tracking server 42 may a computing device which has a processor for executing instructions, a memory for storing data such as instructions and monetary value information, and at least one communication interface. The player tracking server 42 may comprise one device or a number of devices which are in communication with one another at one or more times. For example, the player tracking server 42 may communicate with an external data storage device. Additional details regarding the player tracking server 42 are described below.

In one embodiment, various features of the invention may be implemented or facilitated by one or more secondary servers or other devices. For example, although not illustrated in FIG. 1, a casino might operate one or more casino servers. Such a server may serve as a bridge to facilitate the features of the invention.

In other embodiments, a casino gaming machine 26 may be modified to implement the features of the invention. Currently there are tens of thousands of existing casino gaming machines 26 which were custom-created to present specific games. These gaming machines were not designed to permit new games or other content or features to be presented by the machine without essentially re-programming the entire gaming machine. Such gaming machines are often referred to as "legacy" gaming machines.

In one embodiment, legacy gaming machines may be modified to implement the present invention. In a preferred embodiment of the invention, a gaming machine is retro-fit with a secondary controller. One embodiment of such a configuration is illustrated in FIG. 7.

Figure 7:
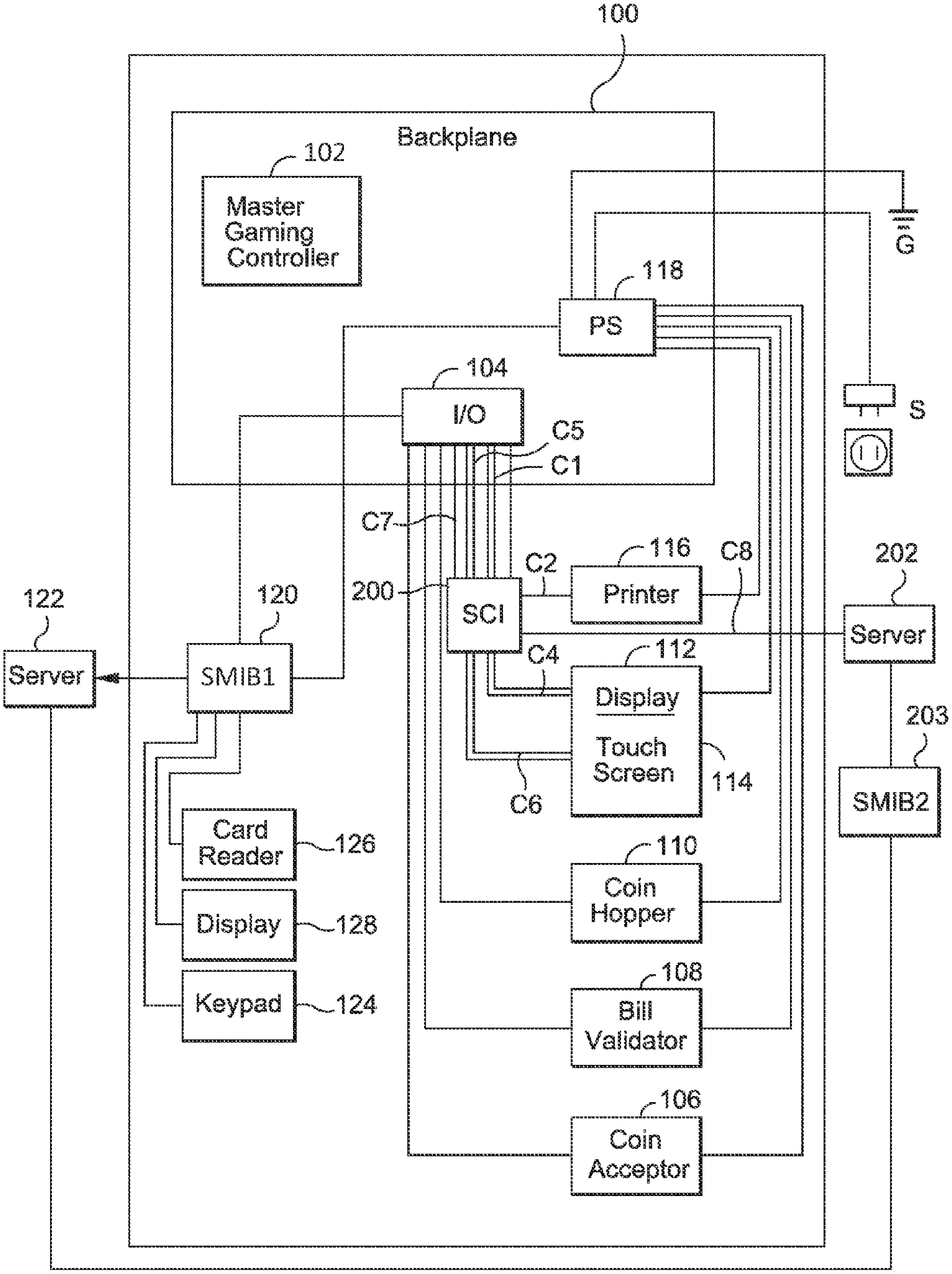
FIG. 7 diagrammatically illustrates one configuration of a casino gaming machine having a secondary interface for facilitating features of the invention.

As illustrated in FIG. 7, in one embodiment a legacy casino gaming machine has a backplane 100 which supports a main or master gaming controller 102. The master gaming controller 102 may comprise a computer processing unit and may include one or more associated components, such as memory devices or the like. In general, the master gaming controller 102 is configured to execute machine readable code for use in operating the gaming machine. For example, the master gaming controller 102 may generate signals used to control various components of the gaming machine and/or generate data for use by those components.

An input/output (I/O) board 104 is associated with the master gaming controller 102. The I/O board 104 may be part of the master gaming controller 102 or, as illustrated in FIG. 7, be connected to the backplane 100. The input/output board 104 may include various connectors or communication ports for use in connecting various components to the master gaming controller 102 (whereby the master gaming controller 102 may provide information, to the components, and/or receive information from those components). As used herein, the information or data may have any of a variety of forms now known or later developed, whether analog or digital, on/off, numeric, wave form or having any other configuration. The input/output board 104 may, for example, include one or more serial (such as RS-232), parallel, USB, Firewire® or other types of connections.

The gaming machine may include a variety of peripheral devices for use in presenting games to a player. For example, the gaming machine may include: a coin acceptor 106 for accepting coins for one or more wagers; a bill validator 108 for accepting paper currency, tickets or other printed documents representing value for one or more wagers; a coin hopper 110 for storing received coins and from which coin payouts may be paid; at least one display 112 for displaying game information, which display may have an associated touch screen 114 for receiving player touch input, and a printer 116 for printing tickets or other media. Of course, the gaming machine might have a wide variety of peripherals or other components, including buttons, rotatable arms, joysticks, trackballs, speakers and other devices.

As illustrated, each of these peripheral devices preferably communicates with the master gaming controller 102 via a communication connection through the I/O board 104 associated with the backplane 100. The particular connection might vary. For example, the printer 116 might be a USB-type device and thus interface with the I/O board 104 via a USB connection and associated port. The coin hopper 110, however, might be an RS-232 type device and connect to the I/O board 104 via a 9 pin connector. Preferably, the master gaming controller 102 can control these various peripheral devices via the communication connections therewith.

The various electrical or electro-mechanical devices of the gaming machine are powered. As illustrated, a power supply 118 may be associated with the backplane 100. The power supply 118 preferably connects to a ground G and an external power source S. The power supply 118 preferably provides power to the master gaming controller 102 and the various peripheral devices of the gaming machine, as illustrated. In one embodiment, the gaming machine may be configured to implement gaming machine accounting and player tracking functions. These operations may be facilitated by a Slot Machine Interface Board or "SMIB" 120. As illustrated, the SMIB 120 may connect to the master gaming controller 102 via the backplane 100, and may communicate with an external server 122 via a communication link. In one prior art configuration, the gaming machine may utilize a Slot Accounting Standard or "SAS" protocol in order to implement various gaming machine accounting functions (such as tracking of wagers, game wins and other information, as is known in the art). Due to the interface with the external server, the gaming machine accounting information may be obtained or tracked externally to the machine.

In addition, the gaming machine may include a player tracking feature. The player tracking feature may be implemented via components such as a keypad 124, a card reader 126 for reading cards or other media, other peripheral devices, such as a display 128. The player tracking devices or components may interface with the SMIB 120, and thus with the external server 122. In this manner, information regarding a particular player's play may be tracked. For example, a player may insert a player card having player identification information associated therewith, and that information may be provided to the server 122. Thereafter, game play information may be provided to the server 122, as known to be associated with the particular player identified by the provided identification information.

As just described, the gaming machine is a fully integrated and pre-configured device for presenting one or more wagering games to a player. As indicated above, however, such a gaming machine has a number of drawbacks owing to the specific configuration of the device.

In a preferred embodiment of the present invention, a secondary controller or interface (SCI) is provided which, when associated with a gaming machine, permits the gaming machine to provide additional or secondary functionality from its basic or pre-configured functionality. In one embodiment, the SCI is particularly suited to use with an existing gaming machine, including a gaming machine pre-configured in the manner illustrated in FIG. 1 and described above, or in a manner similar thereto.

The SCI, its method of use, its association with a gaming machine and system of the invention, will now be described first with reference to FIG. 7. For purposes of illustration, the SCI 200 is discussed in association with a gaming machine configured as illustrated in FIG. 1. Such a gaming machine may comprise an existing legacy machine having limited functionality.

The SCI 200 preferably comprises hardware, such as one or more circuit boards. The SCI 200 may comprise software, such as machine readable code. Such software, however, may be implemented as hardware.

In one embodiment, the SCI 200 is configured to communicate with one or more components of a gaming machine. As such, the SCI 200 includes one or more ports via which communication links may be established between the SCI 200 and those components. Referring to FIG. 7, in one embodiment, the SCI 200 is interposed between various of the components of the gaming machine and the I/O board 104, and thus the master gaming controller 102 (which receives information or signals from the I/O board 104 and provides information or signals to the I/O board 104). In this manner, the SCI 200 can monitor or override instructions or data provided to those components by the master gaming controller 102 and monitor or override instructions or data provided by those components and intended for the master gaming controller 102.

As illustrated, the SCI 200 is interposed between the I/O board 104 and the printer 116, the I/O board 104 and the display 112, and the I/O board 104 and the touch screen 114. The SCI 200 may be interposed between the I/O board 104 and other of the components. A first communication link C1 is provided between the SCI 200 and the I/O board 104. A second communication link C2 is provided between the SCI 200 and the printer 116. In combination, these communication links C1 and C2 permit the master gaming controller 102 to still communicate with the printer 116 through the SCI 200 (preferably as controlled or monitored by the SCI 200). In addition, however, this configuration permits the SCI 200 to communicate directly with the printer 116.

Similarly, a first communication link C3 is provided between the SCI 200 and the I/O board 104. A second communication link C4 is provided between the SCI 200 and the display 112. In combination, these communication links C3 and C4 permit the master gaming controller 102 to still communicate with the display 112 through the SCI 200 (preferably as controlled or monitored by the SCI 200). In addition, this configuration permits the SCI 200 to communicate directly with the display 112.

A first communication link C5 is provided between the SCI 200 and the I/O board 104. A second communication link C6 is provided between the SCI 200 and the touch screen 114. In combination, these communication links C5 and C6 permit the master gaming controller 102 to still communicate with the touch screen 114 though the SCI 200 (preferably as controlled or monitored by the SCI). In addition, this configuration permits the SCI 200 to communicate directly with the touch screen 114.

It will be appreciated that the communication protocols utilized between the various components and the configuration of the communication ports and links may vary dependent primarily upon the configuration of the components. For example, if the printer 116 is configured as a USB type device, a USB communication protocol and associated ports may be utilized. In other embodiments, parallel, serial or other communication protocols and configurations may be utilized. The communication links may be wired or wireless.

In one embodiment, a communication link C7 is provided between the SCI 200 and the I/O board 104. In a preferred configuration, the communication link C7 is established between the SCI 200 and a secondary SAS port of the master gaming controller 102. In particular, one common configuration for the master gaming controller 102 is to have two communication ports through which communications may be established using the SAS protocol. As indicated above, in a common gaming machine configuration, the master gaming controller 102 may communicate with the SMIB 120 via one of these ports, generally the “primary” port. In a preferred configuration, the SCI 200 is connected to the master gaming controller 102 via the secondary port (though in other embodiments, the SCI 200 could be connected to the primary port, where the SCI 200 could control communications via that port (interrupt or pass-through)).

Yet another communication link C8 is provided between the SCI 200 and at least one external device. Preferably, that device comprises at least one server 202. The SCI 200 may transmit information over this communication link C8 to the server 202 and/or receive information over this link from the server 202. It will be appreciated that the SCI 200 might be configured to communicate with more than one external device, such as more than one server or other sources of information, either via one or more communication links. In one embodiment, the server or servers 202 may include a game management system, a media management system and/or a feed of media content (such as television/cable).

In a preferred embodiment, the server or servers 202 performs validation/redemption functions. In such an embodiment, the server or servers 202 may communicate with one or more external SMIBs 203, which SMIBs 203 are in communication with the gaming system external server 122 (which may perform host accounting and/or player tracking functions, among others). The number of external SMIBs 203 may vary, such as to ensure that a sufficient number of SMIBs exist to process transactions forwarded by the SCI 200.

Power may be provided to the SCI 200 from a dedicated power source or via the power source S to the gaming machine.

In this configuration, the interposition of the SCI 200 into the gaming machine does not interfere with the normal operation of the gaming machine. In particular, the gaming machine may present one or more wagering games or other events or activities to a player, as the gaming machine was originally designed. For example, in the presentation of a game, the master gaming controller 102 generates game data for display by the display 112. This data is simply transmitted to the I/O board 104 and then along communication links C3 and C4 to the display 112, through the SCI 200. Likewise, a player’s touch input to the touch screen 114 is transmitted to the master gaming controller 102 via communication links C5 and C6 through the SCI 200.

In one embodiment, various features of the invention may be implemented through the SCI 200. The SCI 200 may connect to a casino server, such as casino server 24 or casino server 202. In this manner, reservation information which is obtained at the casino gaming machine 26 by the SCI 200 may be provided to the casino server. As indicated above, for example, such might comprise information regarding a reservation made by a player at a gaming machine, such as casino gaming machine 26, which information may then be used to reserve a casino gaming machine 26 for the player at or about a time specified by the player. Likewise, reservation information which is made externally, and may be communicated to a casino gaming machine 26, such that the SCI 200 may reserve the casino gaming machine 26 for a specified player and time. A reservation that is made externally may be made using another casino gaming machine 26 or a presentation device 22, for example. Such information may be communicated to the casino gaming machine 26 via a casino server 24.

For example, reservation information may be transmitted from a casino server 24 via a communication link to an SCI 200 of a casino gaming machine 26, thus permitting the SCI 200 to reserve the casino gaming machine 26 in accordance with information about a reservation. A player might communicate with the SCI 200 of a casino gaming machine 26 via a casino server 24, which server 24 supports a website comprising one or more web pages for display at a presentation device 22. The website allows the player to select a particular casino gaming machine 26 and link to the selected machine to make a reservation. Once linked, the SCI 200 of the selected machine may effectuate the reservation for the player.

As is discussed herein, SCI 200 can use the reservation information to lock a casino gaming machine 26 for a reserving player. The SCI 200 may cause the casino gaming machine 26 to display a reservation message indicating that the casino gaming machine 26 is currently reserved and locked. Additionally and prior to the reserved time, a message may be displayed at the reserved casino gaming machine 26 to alert a player that the casino gaming machine 26 is reserved and will be locked to players other than the reserving player for a period of time.

As is discussed herein, a fee may be charged for reserving a casino gaming machine 26. SCI 200 may communicate with an accounting server 40 to redeem credits and/or winnings in the amount of the fee. Where the player provides payment in the form of currency, credit and/or debit transaction, SCI 200 may communicate with an accounting server 40 to complete the payment transaction and store information about the payment transaction.

SCI 200 may communicate with player tracking server 42 to provide player tracking information. As is discussed herein, user/player identification information may provided in the course of reserving a casino gaming machine 26, which information may be communicated by SCI 200 to player tracking server 42.

As one example, the SCI 200 may capture information about a reservation, including without limitation player identification information, gaming machine identification information, reservation date and time information, and the like. The SCI 200 may then route the reservation information to a casino server 24. A casino server 24 may maintain a centralized repository of reservation information, which information may act as a backup of reservation information maintained by each casino gaming machine 26. Such a repository may be used by a casino server 24 to facilitate notifying a player about the player’s reservation via one or more messages. The casino server 24 may notify a player that a reserved casino gaming machine 26 is available. Such message may also be transmitted by a casino gaming machine 26.

As indicated herein, in one or more embodiments, aspects of a player’s activities may be tracked. In one embodiment, a player’s casino gaming activities may be tracked by a player tracking system, such as via the player tracking server 42. Such systems are well known in the art and are thus not described in detail herein. Of course, the player’s reservation activities may be tracked by a casino server 24.

Figure 2:
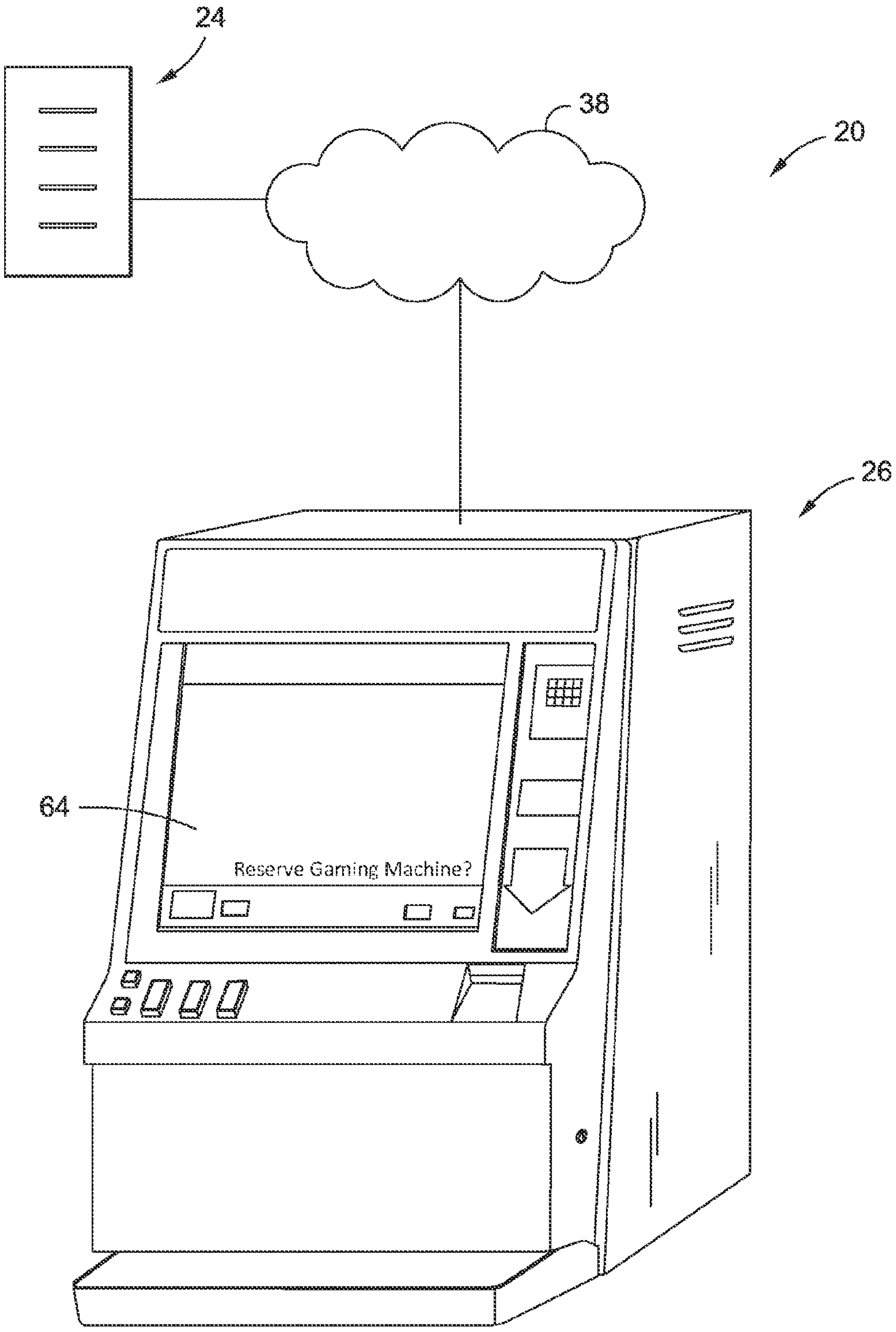
FIG. 2 diagrammatically illustrates a casino gaming machine having a player reservation feature.

FIG. 2 illustrates a casino gaming machine 26 having a player reservation feature. In the example shown, display 64 of a casino gaming machine 26 displays a message prompting the player to reserve a casino gaming machine. By way of a non-limiting example, display 64 may be a touch-screen display, and the player may access the reservation feature by touching a region of the display, such as a region that is coincident with the prompt.

In one embodiment the reservation may be initiated by a player, such as by the player accessing a reservation screen or providing input to a "reservation" button as indicated above. In another embodiment, the player might be prompted to initiate a reservation. For example, the casino server 24 might track the player's game play and note that the player likes to play casino gaming machine 26 number XR8988 on Friday evenings. When the player begins play on another machine on a Wednesday, the casino server 24 may check and note that casino gaming machine XR8988 is not yet reserved for play on Friday and the casino server 24 may then send a message to the casino gaming machine 26 that the player is playing, offering the player the chance to reserve their favorite machine XR8988 during their favorite time on Friday evening (such a message might, for example, be routed to the SCI 200 which then causes the message to be displayed on the display of the casino gaming machine 26 which the player is presenting playing). Of course, such a message might be transmitted to a player in various other manners.

Figure 3:
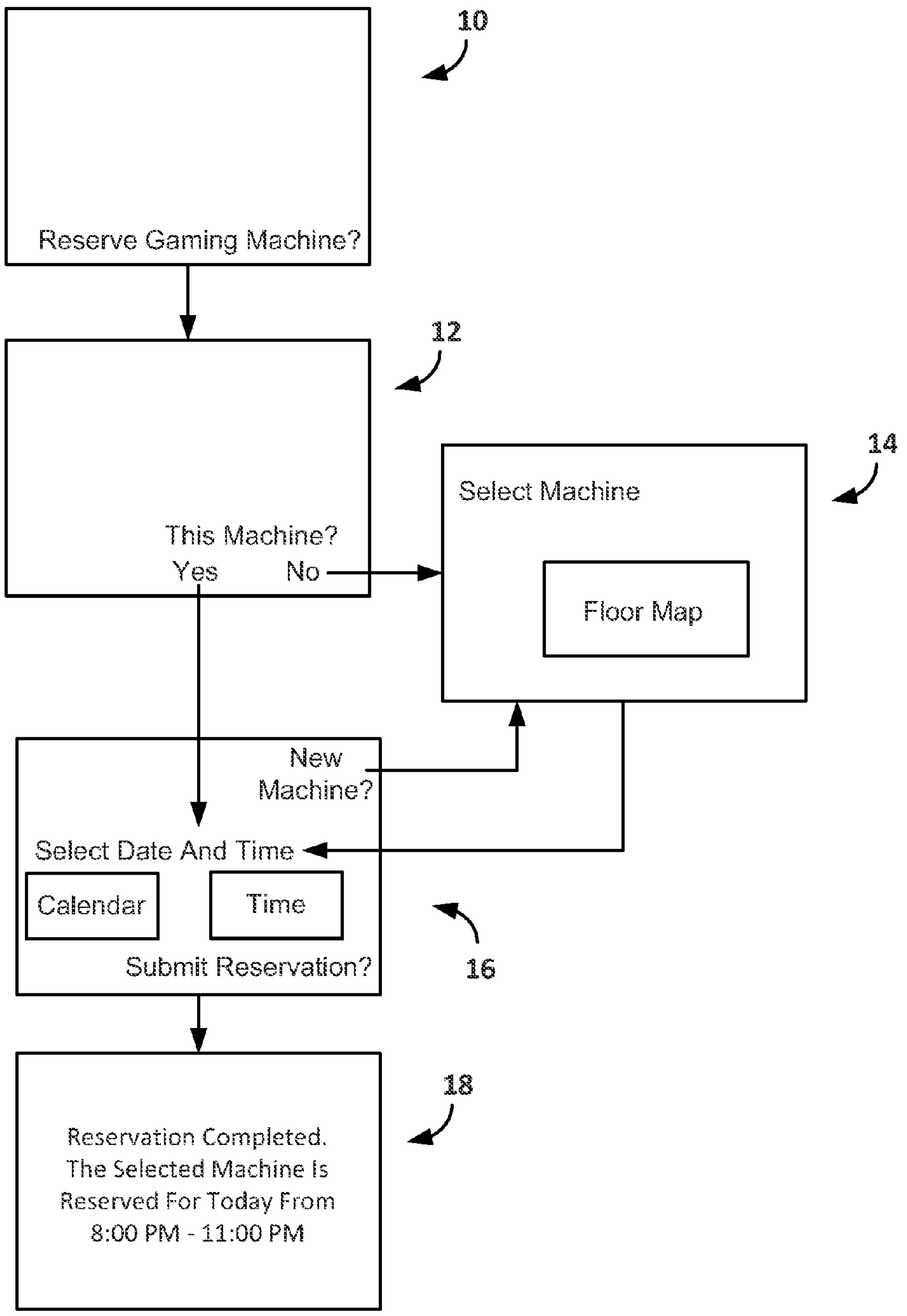
FIG. 3 diagrammatically illustrates a user interface comprising one or more screen displays of a player reservation feature.

In response to player input indicating a desire to reserve a casino gaming machine 26, SCI 200 is configured to display a user interface, which user interface may comprise one or more screen displays, to assist the player in reserving a casino gaming machine 26, such as those shown in FIG. 3. SCI 200 may control display 64 of a casino gaming machine 26 to display screens including screens 10, 12, 14, 16 and 18. Such screens may comprise graphical user interfaces (GUIs). As discussed herein, screen 10 might be an initial screen with a message prompting the player to reserve a casino gaming machine 26. Screen 12 may be displayed in response to input indicative of a player's desire to reserve a casino gaming machine 26, which input can comprise receipt of touch-screen input, for example.

Screen 12 displays a message prompting the player to indicate whether the player wishes to reserve the casino gaming machine 26 displaying the prompt or another machine. If the player wishes to reserve another machine, SCI 200 may be configured to control display 64 to display screen 14, which screen may include one or more casino floor maps, which map or maps the player can navigate to locate a desired casino gaming machine 26. It should be apparent that a casino floor map is one example of a display component that may be used to facilitate player selection of a desired casino gaming machine 26. Other non-limiting examples of display components that may be used in place of, or in addition to, a floor map include a listing of available casino gaming machines 26, a recommendation including one or more casino gaming machines 26, which recommendation may be based on a player's past reservations, preferences of the player and/or other players determined to have similar preferences, machine popularity, and the like.

By way of a non-limiting example, the floor map may allow the player to navigate to a specific casino gaming machine 26 by selecting a floor, where there are multiple floors, and/or a section of a floor, where there are multiple sections. By way of a further non-limiting example, the display 14 may include controls to zoom in/out and/or scroll up/down. As yet a further non-limiting example, the floor map may use an icon or other user interface component to represent a casino gaming machine 26, which icon can be selected by the player to view details about the machine and/or to select the machine for reservation.

In the illustration provided in FIG. 3, screen 16 may be reached from screen 12, where the player has indicated a desire to reserve the casino gaming machine 26 that the player is presently using, or from screen 14, where the player has selected a casino gaming machine using screen 14, e.g., using a floor map. In the illustration, screen 16 allows the player to specify the date and time of the reservation using a date component and a time component. The date component may be a calendar, which calendar might default to the current month and day of the month, and may allow the player to select the default or another month and/or day. The date component may use one or more visual indicators to indicate whether or not a day of the month has available reservation slots or times, such visual indicator may highlight those days that have available slots/times and/or strike through those days that do not have available slots/times. The time entry component may allow the player to select from available times or time slots for the selected month and day. As with the date component, the time component may include visual indicator to indicate whether or not a time is available for reservation. The player may be prompted to submit the reservation where the player has specified a valid date and time for the reservation.

As indicated above, a player may be required to pay for a reservation or certain reservations might be free. The calendar or other information may include reservation fee information. For example, the calendar might show certain dates or times when reservations could be made for free or in exchange for casino points or the like, and other dates and times when reservations may require a monetary payment. The calendar might also show that reservation fees might vary, such as being more expensive at peak use times and being less expensive at non-peak times or the like. Thus, a player might use the "cost" component to determine their desired reservation. It will be appreciated that the cost of the reservation (including whether it is free), may depend upon a variety of criteria, such as the time of day, day of the week, casino location, gaming machine type or location, duration of the reservation (e.g. a 30 minute reservation may be free but a 2 hour reservation may require a fee), etc.

As indicated above, in one embodiment a player might be permitted to reserve a gaming machine in exchanged for an agreement to wager a certain amount, such as an agreement to wager all games played during the reservation period at a minimum wager amount. Such a minimum wager amount might comprise a maximum wager which is permitted for the game at a certain monetary denomination. For example, if the game can be wagered at between 1 and 5 credits of $1.00 denomination, the player might agree to place the maximum $5.00 wager on each game. In such a configuration, the SCI 200 may control the gaming machine to permit the player to place only such minimum wagers for games played during the reservation period.

Screen 16 displays a message indicating that the player has successfully reserved a casino gaming machine 26 selected by the player. The message may indicate information identifying the reserved time. The player may return to playing the casino gaming machine 26 after the reservation process is completed, or where the player elects to exit the process before the reservation process is completed.

As is discussed herein, a reserved casino gaming machine 26 may display a message notifying players that the machine is reserved for a specified time. The message may be displayed when the reservation is made or may be displayed at another time, such as within a predetermined time of the reserved time, e.g., one hour before the reserved time. The message may be displayed to alert other players that the casino gaming machine will be unavailable for play during the reserved time. Where the reserved time arrives, the SCI 200 may cause the casino gaming machine 26 to display a message to indicate that it is locked except for play by the reserving player. Where the casino gaming machine 26 is currently being used by a player other than the reserving player, the SCI 200 may wait for the other player to finish playing before locking the casino gaming machine 26. For example, the gaming machine 26 might be locked once a particular game which is being played when the reservation takes effect, ends. In another configuration, a player of a gaming machine might be warned that a reservation is about to start and be given a period of time to complete their game(s) and if not completed, the machine may lock at the beginning of the reservation period.

In one embodiment, players might be able to "outbid" or pay to override another player's reservation. For example, a reservation might initially be available to a player for a base fee or points or the like (including free). Once reserved, another player might acquire or override that reservation by paying a higher fee, greater points or the like. In the instance where a first player's reservation is overridden, the first player's points, fee or the like is preferably returned. As one example of this feature, a first player may reserve casino gaming machine 26 from 7-9 p.m. on Friday. A second player may be playing that gaming machine at 6:45 p.m. on Friday and receive a notice that the gaming machine is about to be locked in favor of the first player's reservation. The notice may include the option for the second player to override the reservation, such as with a prompt "would you like to reserve this machine for continued play for a fee of $X?".

Figure 4:
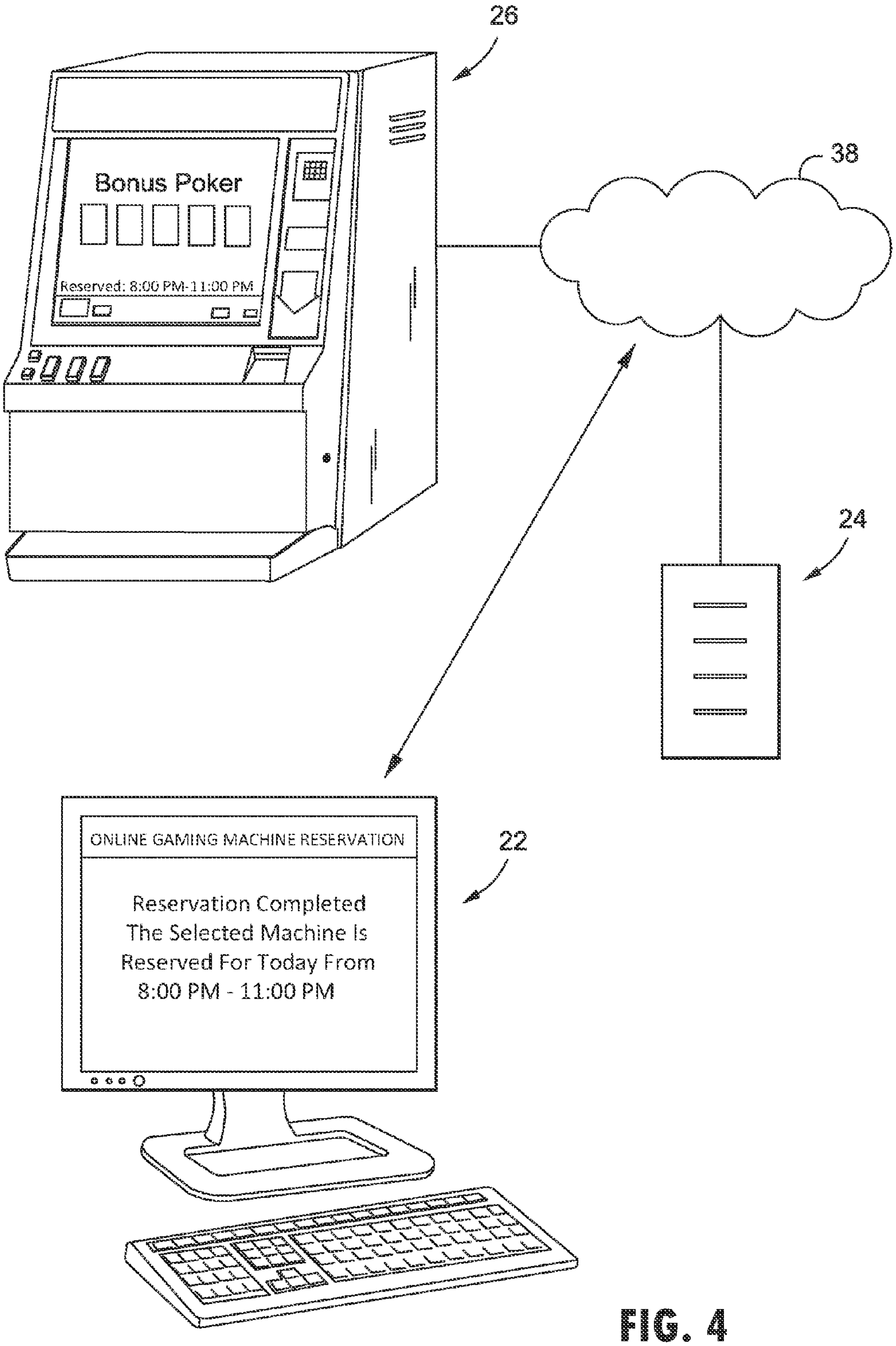
FIG. 4 diagrammatically illustrates one configuration of a gaming system including at least one casino gaming machine and at least one presentation device being used to access a player reservation feature of the at least one casino gaming machine.

In accordance with one or more embodiments, a player may use a device other than a casino gaming machine 26 that is being reserved to make a reservation. As discussed herein, a device may include another casino gaming machine 26 or any presentation device 22, which may include without limitation a phone, tablet, personal computer or other device. FIG. 4 provides an example in which a casino gaming machine 26 may be reserved using a presentation device 22. In the illustration, a player may communicate with the SCI 200 of a casino gaming machine 26 from a presentation device 22, such as via a casino server 24 and a website. The website may include one or more web pages transmitted via the casino server 24, which might display information similar to that provided by screens 14, 16 and 18 of FIG. 3, for example. Thus, the website may include a casino floor map and information about each machine, thereby allowing the player to select a particular machine and then link to that machine to perform the reservation process. The SCI 200 of the selected machine may cause one or more reservation pages, which may include content similar to screens 16 and 17 of FIG. 2, to be transmitted to the presentation device 22. By way of some non-limiting examples, SCI 200 transmit the one or more reservation pages to be transmitted to the presentation device 22 via a communication link with the device 22, which link may be established by a casino server 24. Such a transmission may be made via a casino server 24.

In one embodiment of the invention, reservations may be tracked and maintained centrally, such as at the casino server 24, but be implemented at each particular gaming machine 26. For example, a player might make a reservation via the casino server 24 (either from a presentation device 22 or at a gaming machine 26). The casino server 24 could determine whether the reservation for the particular machine is available and if so, log the reservation. A reservation could be implemented by the casino server 24 sending a reservation signal or information to the SCI 200 of the designated gaming machine 26, such as when the reservation is to take effect.

Where the reservation is successfully made, a message may be displayed such as that shown in FIG. 4 on presentation device 22. Additionally, as is discussed above, the reserved casino gaming machine 26 may display a message notifying players that the machine is reserved at a specified time. The message may be displayed on the reserved casino gaming machine 26 when the reservation is made or may be displayed at another time, such as within a predetermined time of the reserved time, e.g., one hour before the reserved time.

In the example illustration shown in FIG. 4, the casino gaming machine 26 is reserved "remotely" using a presentation device 22.

It should be apparent that one casino gaming machine 26 may be used to reserve playing time on another casino gaming machine 26 in much the same manner discussed in connection with FIGS. 3 and 4, for example. In accordance with one or more embodiments, a casino server 24 may be communicatively linked with an SCI 200 of each of a first casino gaming machine 26 and second casino gaming machine 26. The casino server 24 may be configured to communicate with the SCI 200 of the first casino gaming machine 26, including communicating at least one web page of a website, which web page, or pages, includes a casino floor map and information about each casino gaming machine 26 for use by a player in identifying a casino gaming machine 26 for reservation. The SCI 200 of the first casino gaming machine 26 may cause a video display of the first casino gaming machine 26 to display the at least one web page of the website. The SCI 200 of the first casino gaming machine 26 being capable of receiving input, such as input provided via at least one player input device of the first casino gaming machine 26, which input identifies the second casino gaming machine 26.

The SCI 200 of the first casino gaming machine 26 being capable of communicating such information to the casino server 24. The casino server 24 may be configured to establish a communication link between the first and second casino gaming machines 26. An SCI 200 of the second casino gaming machine 26 being capable of communicating at least one reservation page to the first casino gaming machine 26 and receiving information for a reservation of the second casino gaming machine 26 made by a player from the first casino gaming machine 26.

In accordance with one or more embodiments, once the player has made a reservation, at or about the reserved time, SCI 200 of the reserved casino gaming machine 26 locks the machine from use except for use by the player that made the reservation, i.e., the reserving player. Where the reserved casino gaming machine 26 is in use by a player other than the reserving player at the start of the reservation, the SCI 200 of the reserved gaming machine 26 may lock the machine as soon as the other player leaves the machine. Where the SCI 200 of a reserved casino gaming machine 26 locks the machine, the machine's SCI 200 may display a message indicated that it is reserved and locked for play except by the reserving player.

Figure 5:
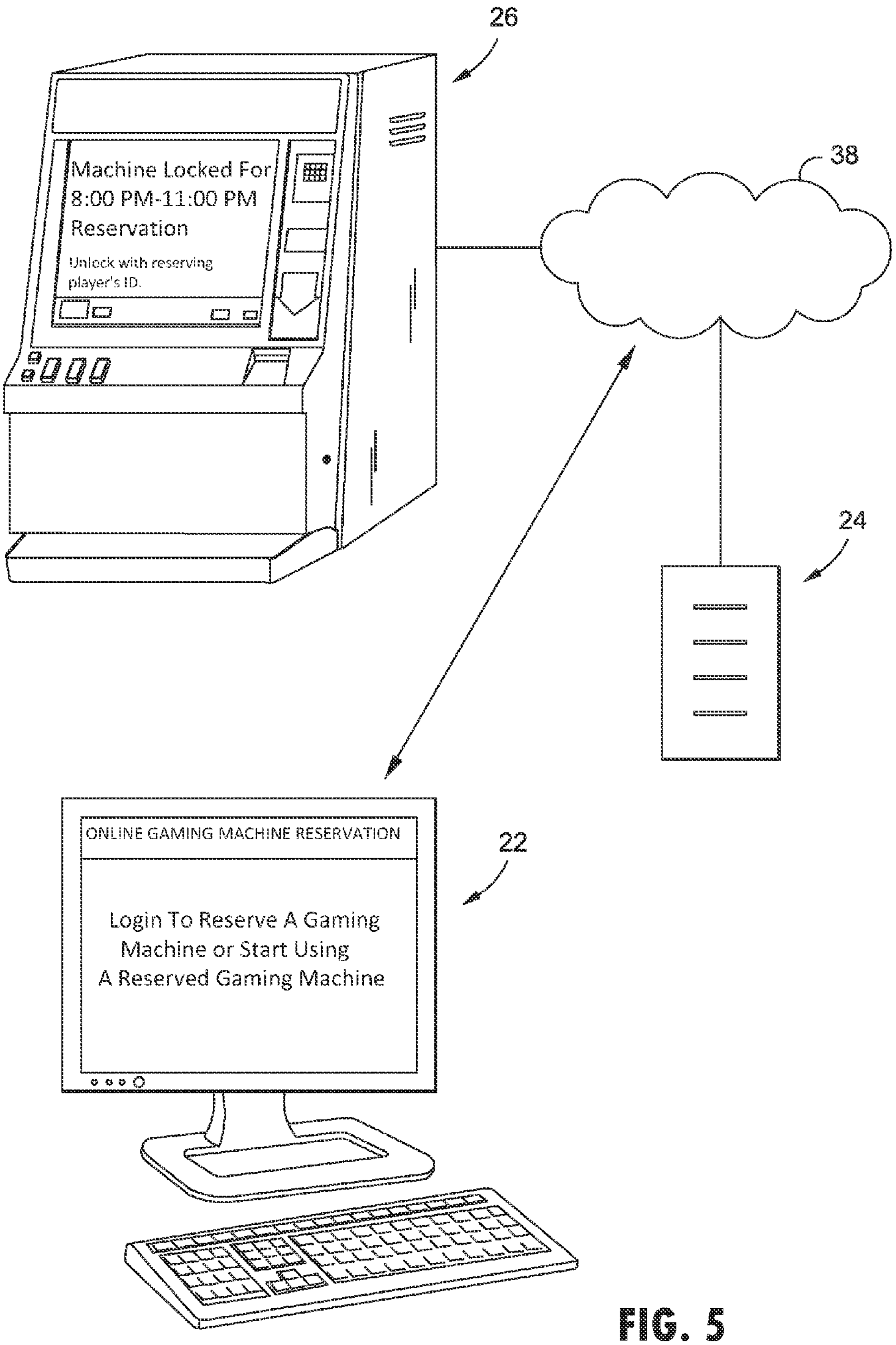
FIG. 5 diagrammatically illustrates one configuration of a gaming system including at least one casino gaming machine and at least one presentation device being used to remotely access the at least one casino gaming machine by a player that reserved the machine using the machine's player reservation feature.

FIG. 5 provides an example of a casino gaming machine 26 displaying a message that the machine is locked. As discussed herein, the reserving player may initiate play at the reserved casino gaming machine 26 or remotely using another device, such as a presentation device 22. In the illustration shown in FIG. 5, where the reserving player wishes to commence playing and is physically located at the reserved casino gaming machine 26, the reserved casino gaming machine 26 may be displaying a message prompting the reserving player to provide identification to unlock the machine. As discussed herein, the player identification may be provided by presenting a ticket dispensed to the reserving player. Alternatively, the reserving player's identification may be provided using another form of identification, such as without limitation the player's casino loyalty/club card, credit card, debit card, driver's license and the like. As yet another non-limiting example, the reserving player may input identification information using a keypad 80 of the reserved casino gaming machine 26, such as by entering a personal identification number (PIN) or other personal identification information including but not limited to a username and password.

In one embodiment, if the reserving player does not access the gaming machine 26 within a certain time of their reservation, the reservation may be lost and the gaming machine 26 may be unlocked. For example, if a player has a 1 hour reservation from 6 p.m. to 7 p.m., the player may lose their reservation if they do not access the machine by 6:15 p.m. This is particularly true if the reservation was provided for free. Also, in one embodiment the player might be required to pay for their reservation when they access the machine (rather than ahead of time when they make the reservation). In such a configuration, if the player does not access the gaming machine 26 and/or pay the fee within a certain time period, they may lose their reservation. In another embodiment, a fee might be charged to a player who does not exercise a reservation which is not pre-paid. For example, a player might make a reservation with a requirement that they pay a fee when they begin game play during the reserved time. If the player does not begin game play, the player might automatically be charged the reservation fee or a penalty fee (such based upon the amount of time of the original reservation, including based upon game play volume, etc.). Such a fee might be charged to a player's account (such as by deducting player points or deducting monies from any monetary accounts the player has with the casino) or a player's credit or debit card or the like (in one embodiment, a player might make a reservation by providing their credit or debit card or other account information, which accounts are not charged at the time of the reservation, but only if the player does not later pay any required reservation fees or the like).

Where the reserving player wishes to play the reserved casino gaming machine 26 remotely, the player may access a reservation website provided to the player's presentation device 22. By way of a non-limiting example, the player may access a reserved casino gaming machine 26 by logging in via casino server 24, which server 24 determines the reserved casino gaming machine 26 and may initiate communication between the player's presentation device 22 and the SCI 200 of the reserved casino gaming machine 26.

Figure 6:
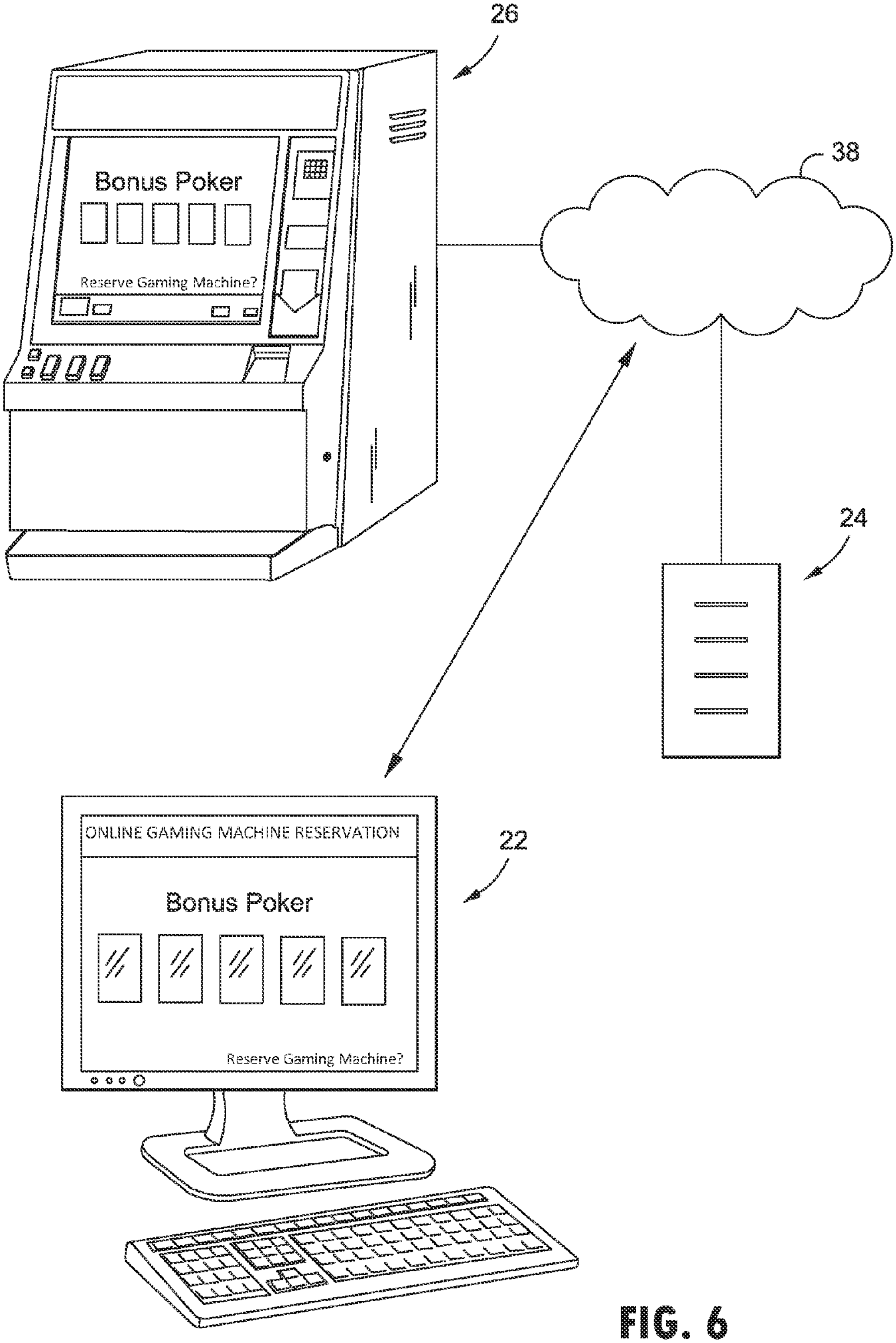
FIG. 6 diagrammatically illustrates one configuration of a gaming system including at least one casino gaming machine and at least one presentation device being used to remotely play the at least one casino gaming machine by a player that reserved the machine using the machine's player reservation feature.

FIG. 6 provides an example of a presentation device 22 in communication with a reserved casino gaming machine 26, such that the player is able to play the reserved machine remotely from the presentation device 22. SCI 200 may connect to a casino server 24, such that game content which is generated at the gaming machine 26 by the master gaming controller 102 or via the SCI 200 may be provided to the presentation device 22 via the casino server 24. Likewise, information or content which is generated externally, such as at the presentation device 22, may be provided to the gaming machine 26. Such externally-generated gaming information may be routed by the SCI 200 to the master gaming controller 102 of the casino gaming machine 26, for example.

In accordance with one or more embodiments, a communication link may be established between SCI 200 of the casino gaming machine 26 and the presentation device 22. The communication link may be established using casino server 24, for example. Once a communication link is established between SCI 200 and a presentation device 22, SCI 200 and the presentation device 22 may communicate via the communication link.

In the example shown in FIG. 6, SCI 200 may cause game information to be displayed by the casino gaming machine 26. Alternatively, where the player is playing remotely, the SCI 200 may be configured to cause the casino gaming machine 26 to display something other than the gaming information, such as message similar to that shown in FIG. 5 indicating that the machine is currently reserved, and therefore unavailable for play by players other than the reserving player.

In accordance with one or more embodiments, a casino server 24 and/or a SCI 200 of a reserved casino gaming machine may cause a message or messages about an upcoming reservation to be transmitted to a reserving player, such as to a casino gaming machine 26 that the reserving player is playing, which may be determined from information provided by player tracking server 42, and/or to the player's presentation device 22, which device may include the player's desktop computer, telephone, PDA, laptop or notebook computer, or other device. The message may be sent when the casino gaming machine 26 that is reserved by the player frees up or at some point prior to or at the start of the reservation. The player may go to the machine or play the machine remotely during the reserved time.

It is contemplated, in accordance with one or more embodiments, that a player may access a previously-specified, or existing, reservation to update or cancel the reservation. In accordance with one or more such embodiments, the player might access an existing reservation from a casino gaming machine 26 and/or from a presentation device 22 in much the same manner as is used to make a reservation.

In an embodiment, network 38 may couple devices so that communications may be exchanged, such as between servers 24, 40 and 42, casino gaming machine 26, presentation devices 22 and/or other types of devices, including between wireless devices coupled via a wireless network, for example. Network 38 may include the Internet, one or more local area networks (LANs), one or more wide area networks (WANs), wire-line type connections, wireless type connections, or any combination thereof.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

The invention has particular advantages and benefits relating to legacy or other gaming machines which are not configured with the functionality described herein, and where such gaming machines could not otherwise implement such functionality without entirely replacing their controller and/or software. In particular, such gaming machines can easily be modified to implement the functionality herein via the use of a secondary controller as described.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A casino system comprising:

at least one casino gaming machine comprising a housing, at least one video display, at least one player input device, a main game controller configured to output a video signal comprising game information to be displayed via said at least one video display regarding a wagering game presented at said gaming machine, and a secondary controller that is (i) interposed between the at least one player input device and the main game controller, (ii) interposed between the at least one video display and the main game controller, (iii) configured to monitor and/or override instructions or data provided by the at least one player input device to the main game controller, (iv) configured to monitor and/or override instructions or data provided by the main game controller to the at least one video display and the at least one player input device, and (v) configured to receive reservation information and process said received reservation information to reserve said casino gaming machine, said reservation information identifying a reservation of said casino gaming machine made by a reserving player and comprising a reservation time and information identifying said reserving player, wherein at or about said reservation time said secondary controller uses said reservation information to lock said casino gaming machine from use except for use by said reserving player.

2. The casino system in accordance with claim 1 wherein when said casino gaming machine is being played by a player other than said reserving player at said reservation time, said secondary controller is further configured to wait for said other player to complete play before locking said casino gaming machine.

3. The casino system in accordance with claim 1 wherein said secondary controller is further configured to unlock said casino gaming machine in response to input identifying said reserving player, said input being received via said at least one player input device of said at least one casino gaming machine.

4. The casino system in accordance with claim 1 wherein said secondary controller is further configured to cause said at least one video display to display at least one reservation page and is further configured to receive said reservation information via said at least one player input device of said at least one casino gaming machine.

5. The casino system in accordance with claim 4 further comprising:

at least one casino server communicatively linked with said secondary controller of said casino gaming machine and a reserving player's presentation device, said at least one casino server configured to communicate with said reserving player's presentation device, including transmitting at least one web page of a website to said presentation device, said at least one web page comprising a casino floor map and information about each of said at least one casino gaming machine for use in identifying a casino gaming machine for reservation;

wherein said secondary controller is communicatively linked with a presentation device of said reserving player and is further configured to communicate said at least one reservation page to said reserving player's presentation device and receive said reservation information from said reserving player's presentation device.

6. The casino system in accordance with claim 5 wherein said secondary controller is communicatively linked with said reserving player's presentation device via said at least one casino server.

7. The casino system in accordance with claim 5 wherein said at least one casino server is configured to transmit a message about said reservation to at least one presentation device of said reserving player, said message notifying said reserving player that said at least one casino gaming machine is available for play in accordance with said reservation.

8. The casino system in accordance with claim 5 wherein said at least one casino server is configured to transmit a message about said reservation to a casino gaming machine currently in use by said reserving player, said message notifying said reserving player that said at least one casino gaming machine is available for play in accordance with said reservation.

9. The casino gaming system in accordance with claim 5 wherein said at least one casino server is configured to send a player a message regarding the availability of a reservation time at one or more casino gaming machines.

10. The casino system in accordance with claim 4 further comprising:

at least one casino server communicatively linked with a secondary controller of each of a first casino gaming machine and a second casino gaming machine, said at least one casino server configured to communicate with said secondary controller of said first casino gaming machine, including communicating at least one web page of a website, said at least one web page comprising a casino floor map and information about each of said at least one casino machine for use in identifying a casino gaming machine for reservation;

wherein said secondary controller of said first casino gaming machine causing said at least one video display of said first casino gaming machine to display said at least one web page of said website, said secondary controller of said first casino gaming machine configured to receive input via said at least one player input device identifying said second casino gaming machine, said secondary controller of said first casino gaming machine configured to communicate information identifying said second casino gaming machine to said at least one casino server;

wherein said at least one casino server is configured to establish a communication link between said first and second casino gaming machines for use in reserving said second casino gaming machine by said reserving player using said first casino gaming machine; and wherein said secondary controller of said second casino gaming machine is configured to communicate said at least one reservation page to said first casino gaming machine and receive said reservation information from said first casino gaming machine.

11. The casino system in accordance with claim 1 wherein said secondary controller is further configured to cause a message about said reservation to be transmitted to at least one presentation device of said reserving player, said message notifying said reserving player that said at least one casino gaming machine is available for play in accordance with said reservation.

12. The casino system in accordance with claim 1 wherein said secondary controller is further configured to cause a message about said reservation to be transmitted to a casino gaming machine in use by said reserving player, said message notifying said reserving player that said at least one casino server is available for play in accordance with said reservation.

13. The casino system in accordance with claim 1 wherein said secondary controller is communicatively linked with a presentation device of said reserving player, said secondary controller is further configured to unlock said casino gaming machine in response to input identifying said reserving player, said input being received by said secondary controller from said reserving player's presentation device.

14. The casino gaming system in accordance with claim 13 wherein said secondary controller is configured to intercept said video signal which is output from said main game controller and route said video signal to a presentation device of said reserving player, said video signal being transmitted to said reserving player's presentation device for presentation of information regarding said wagering game presented at the gaming machine at said reserving player's presentation device.

15. The casino gaming system in accordance with claim 14 wherein said secondary controller is configured to receive game input from said reserving player's presentation device and route said input to said main game controller of said casino gaming machine.

16. The casino gaming system in accordance with claim 1 wherein said secondary controller is further configured to assess a fee for said reservation and accept payment of said fee from said reserving player.

17. The casino gaming system in accordance with claim 1 wherein said secondary controller is further configured to assess a fee for said reservation and waive said fee for said reserving player that has reached a certain threshold level of play.

18. The casino gaming system in accordance with claim 17, wherein said fee comprises a minimum wager amount for all games played during said reservation time and wherein said secondary controller controls said casino gaming machine to permit presentation of games only upon said player placing at least said minimum wager during said reservation time.

* * * * *